Oct. 19, 1954     F. C. SCHWANEKE     2,692,126
PORTABLE FOOD MIXER

Filed April 3, 1952     4 Sheets-Sheet 1

INVENTOR.
Fred C. Schwaneke
BY
Watson D. Harbaugh
Atty.

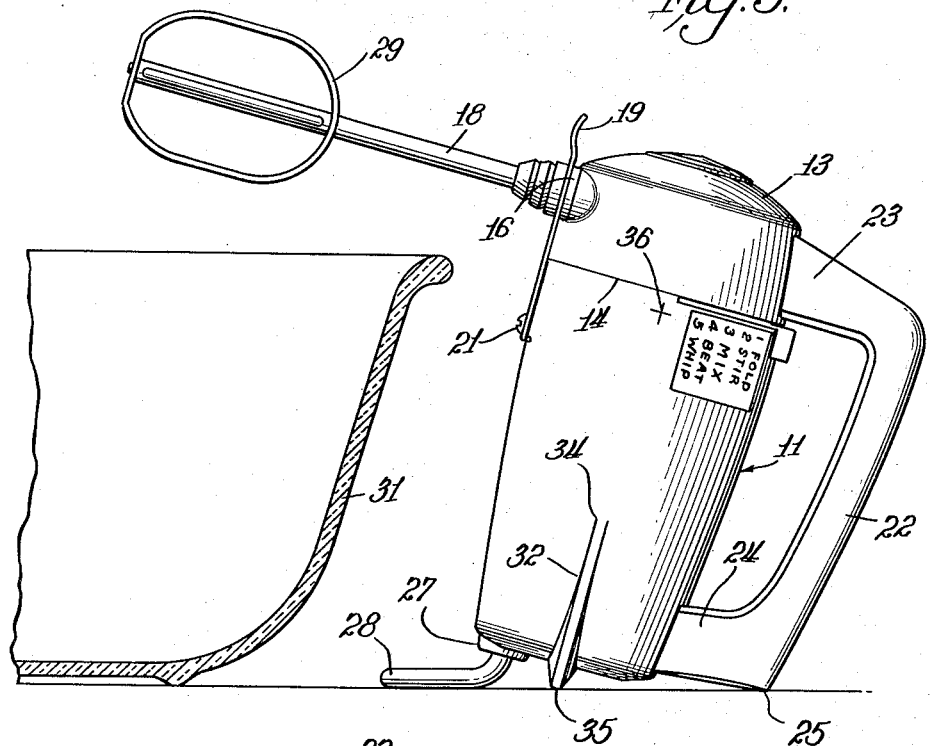
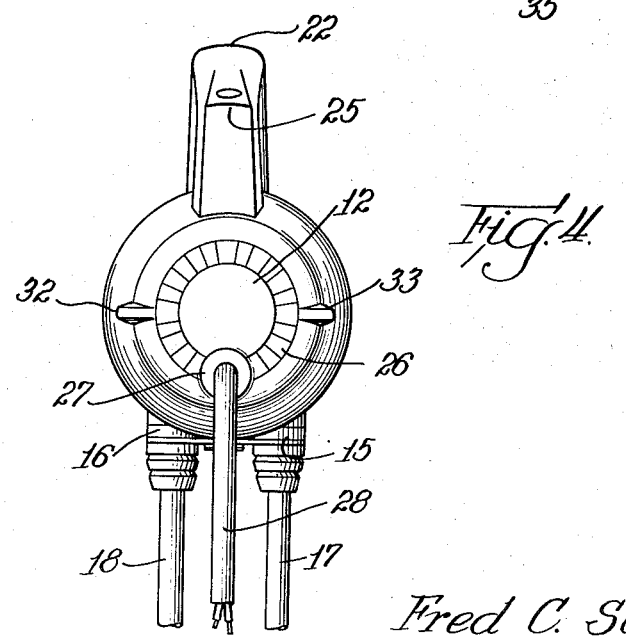

Oct. 19, 1954  F. C. SCHWANEKE  2,692,126
PORTABLE FOOD MIXER
Filed April 3, 1952  4 Sheets-Sheet 3
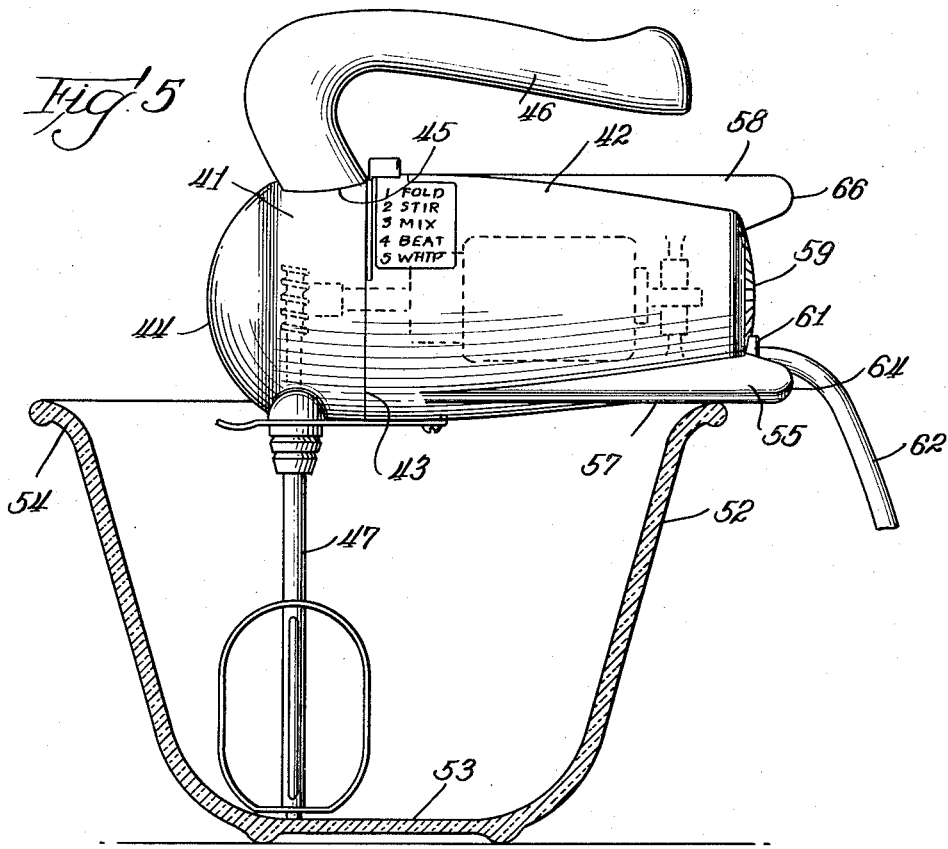
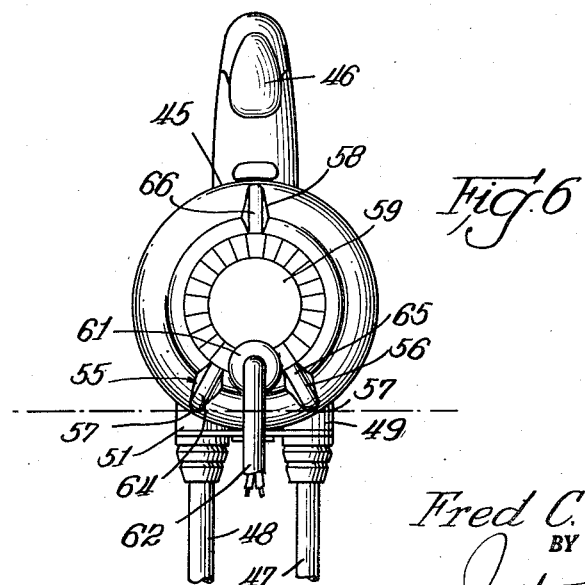
INVENTOR.
Fred C. Schwaneke
BY

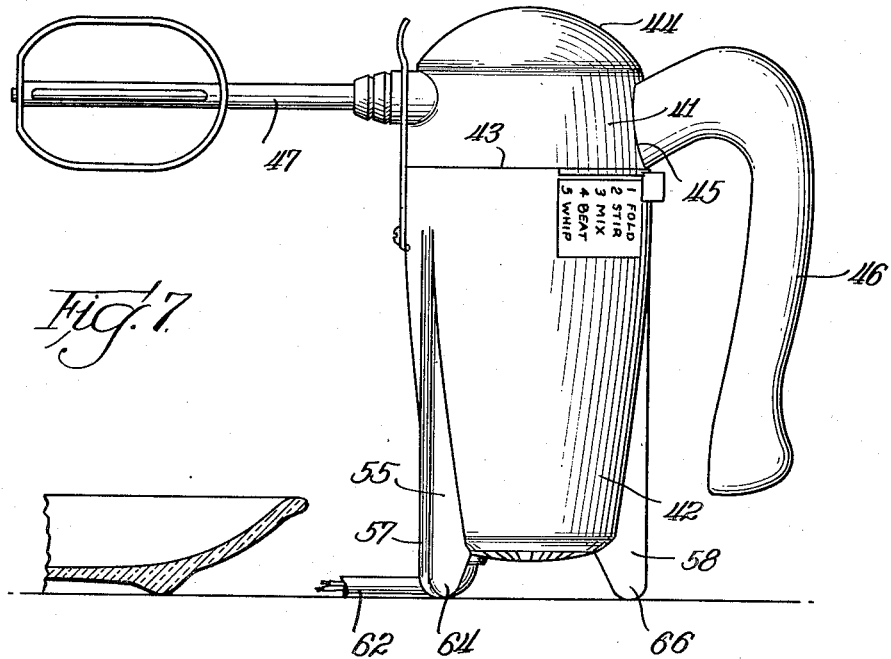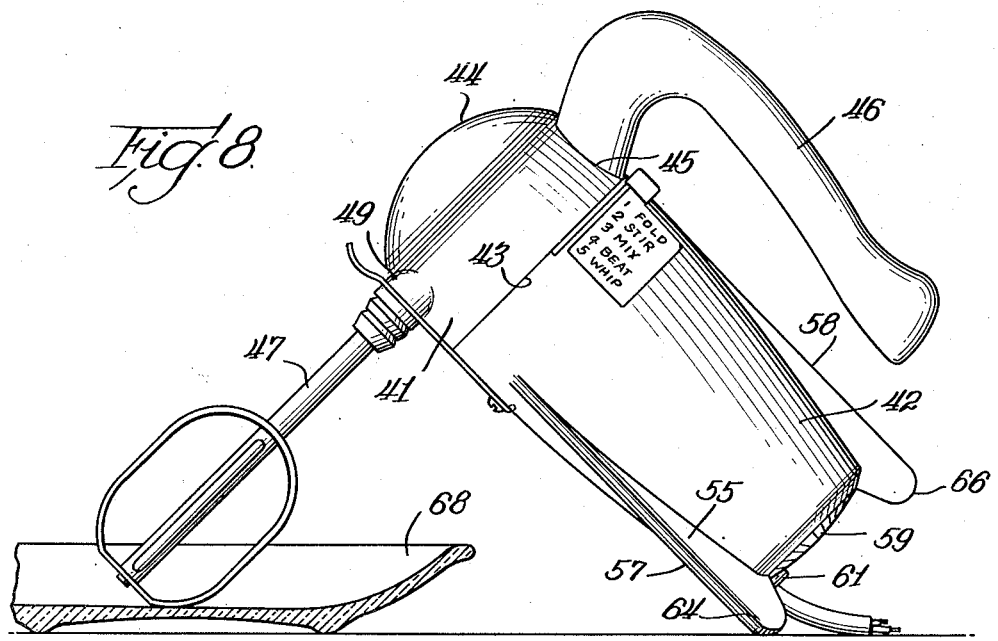

Patented Oct. 19, 1954

2,692,126

UNITED STATES PATENT OFFICE 2,692,126

PORTABLE FOOD MIXER

Fred C. Schwaneke, Chicago, Ill., assignor to Dormeyer Corporation, Chicago, Ill., a corporation of Illinois Application April 3, 1952, Serial No. 280,221

5 Claims. (Cl. 259—131)

The present invention relates to portable food mixers and concerns itself more particularly with devices of this class which utilize an electrically driven motor contained in a tubular casing from which there extend perpendicularly a pair of beater spindles.

A principal object of the invention is to provide an electric motor driven food mixer wherein the motor and transmission are completely encased in a single protective housing and which utilizes a pair of beater spindles disposed perperpendicular to the principal axis of the protective housing together with simple and ruggedly constructed support structure upon which the casing may be stably balanced in an upright position with the beater spindles extended.

Another object of the present invention is to provide a manually portable food mixer apparatus with a motor and power transmission system contained within a generally tubular enclosure having agitator or beater spindles projecting in a direction generally perpendicular to the principal axis of the casing and with a support structure aesthetically and functionally compatible with the utility features of the appliance.

A still further object of the present invention is to provide a manually portable food mixer with electric power motor and transmission apparatus contained within a substantially cylindrical casing, in which the power supply cord for the motor passes through a rear wall of the casing and with a tilt-back system of supporting legs extending rearwardly of the casing whereby the mixer may be placed out of hand in an erect position while permitting the cable sufficient intervening clearance to be flexed sidewardly without interference to the stability of said mixer thus disposed.

Additional objects of the present invention are such as will appear during the course of the following explanation of the various features and operation, in conjunction with the accompanying drawings wherein:

Fig. 3 is a side elevational view of the same apparatus and mixing bowl fragment with the mixer shown in its tilt-back or dormant position;

Fig. 4 is a rear elevational view of the same device shown in Figs. 1 through 3 with portions of the beater spindles broken away;

Fig. 5 is a side elevational view of a modified form of mixer apparatus shown in its utility position with its beater spindles inserted into the cavity of a mixing bowl illustrated sectionally;

Fig. 6 is a rear elevation view of the mixer apparatus with portions broken away featuring the construction illustrated in Fig. 5;

Fig. 7 is a side elevational view of the apparatus illustrated in Figs. 5 and 6 shown in its poised or up-ended condition; and Fig. 8 is a side elevational view of a mixer apparatus according to the construction featured in Figs. 5 through 7 disposed in a forward leaning position with its weight partially resting on its beater spindles.

Figure 1:
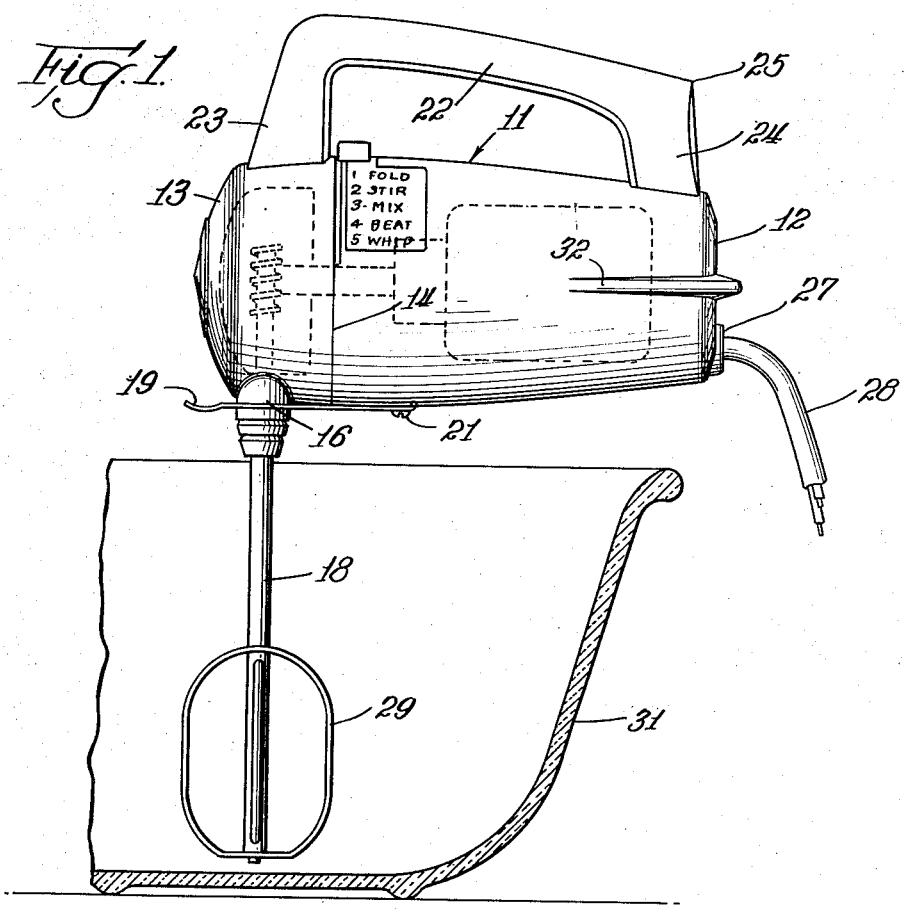
Fig. 1 is a side elevational view of one embodiment of food mixer incorporating various features and advantages of the present invention and illustrated in connection with a mixing bowl shown in fragmentary cross section.

A fundamental concept of this invention is that of a portable food mixer with a motor and transmission mechanism contained within a substantially cylindrical, but slightly barrel-shaped casing or enclosure housing having transversely partitioned closure walls at front and rear. Near its front end, and extending perpendicularly to the principal housing axis, the mixer is provided with a pair of removable interdigitating beaters carried upon parallelly extending spindles. At the rear of the housing and preferably in diametric opposition to the spindles the casing is provided with a manually engageable handle, the principal portion of which lies substantially longitudinal to the main axis of the housing. The handle is of adequate proportions to be gripped with a single hand and to enable the mixer to be maneuvered by means of simple and minor wrist movements between utility and rest positions.

The invention has been illustrated in the drawings in terms of two principal embodiments, the construction and operation of which will be taken up sequentially during the course of the following detailed specification. In both parts of this disclosure, like reference numerals have been employed to designate corresponding parts throughout.

Figure 2:
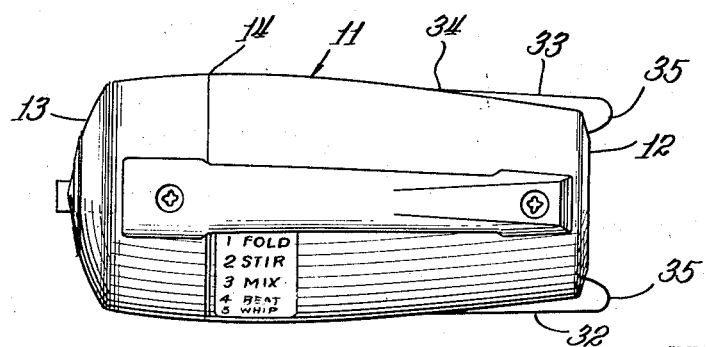
Fig. 2 is a plan view of the mixer apparatus illustrated in Fig. 1.

Directing attention now to a first or preferred embodiment shown particularly in Figs. 1 through 4, a substantially cylindrical housing member 11 will be observed to converge more pronouncedly in a rearward direction whereat it terminates with a relatively shallow convex end wall 12, Fig. 4. This member 11 converges correspondingly in the opposite direction but to a lesser degree, terminating thereat with a relatively more protuberant convex front wall 13.

In accordance with conventional manufacturing practice, the casing is constructed of two principal casing portions which separate at the parting line 14 for affording access to their hollow interiors. Within the interior of the larger casing portion is contained an electric motor (shown in dotted outline Fig. 1) while within the other portion is a system of transmission gearing driven by the motor for imparting synchronous but reverse rotary motion to two spindle chucks 15 and 16 which carry a pair of spindles 17 and 18 optionally removeable through the manipulation of a springable release member 19 anchored to the housing as at 21.

For convenience in manipulating the mixer with one hand it is provided with a large loop-forming handle 22 suitably made fast both at the front and rear portions 23 and 24 respectively, to one side of the casing 11 and providing a shoulder or projection as at 25. It is to be noted that handle 22 is located on a side of casing 11 diametrically opposite the spindles 17 and 18. This arrangement is designed for a purpose which will appear during the following detailed explanation.

Within the casing end wall or panel 12, which is sometimes provided with an annular vent opening as at 26 for the purpose of admitting a flow of air to cool the windings of the therewithin contained motor, a ringlet or grommet 27 is fitted having a central aperture dimensioned to pass snugly a flexible supply cable 28 which connects the motor with an external source of current supply. The provision of the cord access aperture and grommet 27 in the rear panel 12 rather than elsewhere of casing 11 is a practice which will afford certain well recognized advantages and one ordinarily attended with some disadvantages as will now be explained.

Food mixers of the general class concerned employ a pair of interdigitating beater paddles 29 carried on the lower extremities of the spindle shafts 17 and 18 which protrude at right angles to the principal axis of tubular casing member 11 which encloses all of the internal moving parts. This type of apparatus is used in conjunction with a deep throated mixer bowl such as the one designated 31 and which, during the course of various culinary operations is chargeable with different kinds of food content varying in fluidity and texture.

In order to move the beater paddles 29 freely about within the receptacle space of a deep throated mixing bowl, and in order to contribute toward thorough mixing and agitation of all kinds and grades of miscible masses the apparatus must be light in weight and abundantly compact so that an operator is able to manage with a single hand a full range of movement including changes in position of shafts 17 and 18 in respect to the level of the mix. Accordingly it is important that the bottom or belly curvature of the casing member 11 be clear and free of all manner and nature of obstructions. Also the side wall thereof should likewise, as far as possible be smooth and regular in outline.

Since, therefore, access to the motor is not practically or expeditiously to be arranged for through the side or bottom wall portions of casing 11, the cord and grommet aperture is by natural selection of necessity restricted to the rear wall 12 thereof. But locating the cable access within the rear wall 12 sacrifices for most purposes the utilitarian advantage of resting the mixer appliance upon its rear end after the fashion of tilt-back appliances generally. To be able to stand the appliance at rest, as when the operator requires both hands to accomplish a casual or preparatory operation is of paramount advantage. When adding progressively a series of ingredients into a batter with intermediate mixing, the beater paddles 29 become encrusted and laden. It is not feasible, therefore, to lay the mixer down on its side nor to place the mixer paddles into a receptacle.

The most satisfactory solution is to be able to stand the appliance in a position that the beater paddles 29 may be poised over the mixing bowl 31 in which the principal batter is contained so that drippings are caught and returned to the mixing bowl.

In recognition of the problems and difficulties which beset the designing of a practical and feasible stand up or tilt-back apparatus, there is proposed a motor encasing housing 11 provided with fin-like appendages 32 and 33 which protrude as little as possible beyond the basic contour lines of the casing, and which are located well toward the rear of the casing at about the region designated 34. Moreover, these appendages blend closely with the convergent sides flaring away at an unobtrusive angle with the symmetrically balanced side surfaces. The outermost edges of the two members 32 and 33 run nearly parallel up to a point well towards the rear of the wall 12. At the circle of convergence between the rear wall 12 and the side walls of the larger casing element the fin-like protrusions skirt around and thence are doubled back after the manner best indicated in Figs. 2 and 4 as at 35 so as to constitute a pair of equilateral support projections which together function as two points of a three legged support of which the third point is the already described projection 25 of handle 22.

By closely limiting the extent of projection of the two fin-like extremities at 35 beyond the rear wall 12 in respect to the relative recession of the projection 25 there may be achieved a significant balancing of the casing element 11 after the manner best illustrated in Fig. 3 with its center of gravity which has been designated by the reference numeral 36 located well near the theoretical incenter of the supporting triangle. The precise distribution of weight is not so much a serious or critical factor respecting safety and stability so long as sufficient provision is made to allow for added weight characteristics of a mass of batter material such as may cling to the beater paddles 29.

Equally important with balance and weight distribution as has been discussed is the convenient provision that has been made for reconciling with the aesthetics and simplicity of line styling minimum protrusions which nevertheless allow the cable 28 to be admitted to the interior of the casing through an end wall aperture and grommet arrangement as has already been discussed. The cable 28 may be flexed in accordance with its natural flexibility to one side, and by this arrangement the mixer appliance may be quickly and conveniently tilted back by a simple wrist movement on the part of the operator.

*Modification*

Attention is now directed to Figs. 5 through 8, inclusive, wherein a modified embodiment of the invention has been disclosed. As with the preferred form, a principal closure or casing is contemplated consisting of the cup elements 41 and 42, which butt each other at the parting line 43. The forward cup or casing element 41 is provided with a rounded wall portion 44, more convex than in the case of the preferred embodiment and at one side thereof designated 45 there is secured to this portion of the casing a handle 46, in this instance of the open ended type.

Also in correspondence with the preferred form of construction, the transmission gearing is contained inside of the forward casing element 41 so that the beater spindles 47 and 48 extend perpendicularly thereof, being held within the spindle chuck members 49 and 51, Fig. 6. It is to be noticed that in conjunction with this embodiment of food mixer a suitably proportioned mixing bowl 52 is contemplated such that when the beater spindles 47 and 48 are disposed therewithin after the manner illustrated in Fig. 5, the extremities of the spindle shafts will rest on the interior surface 53 of the bottom of the bowl while the mixer casing comprised of the elements 41 and 42 is supported after the manner shown.

Of paramount significance in this connection is that the lip or flange 54 of the bowl under such circumstances is adapted to give sliding support to a pair of radial fin formations 55 and 56, see also Fig. 6, whose outermost edges 57 are designed to function as runners or skids being parallel to each other and resting upon the rounded lip or flange 54 of bowl 52.

Although the casing element 42 is for aesthetic and convenience reasons, preferably tapering towards the rearmost extremity of the mixer unit the shape of the fin elements 55 and 56 in respect thereto is but slightly protuberant as a result of which the mixer apparatus when disposed after the manner shown in Fig. 5 in relationship to a proper or suitable depth of mixing bowl 52, permits the beater spindle extremities 47 and 48 to glide upon the interior surface area of the mixing bowl smoothly.

From Fig. 6 it may be observed that the two radial fins 55 and 56 are preferably located at a small angular displacement from and symmetrically on both sides of a plane passing midway between the beater spindles 47 and 48 and that a third such fin designated 58 is formed on the surface of case element 42 along an element diametrically opposite the described fins 55 and 56.

As with the preferred embodiment discussed above the rear wall 59 characterized by a shallow convexity is apertured so as to receive an insulation grommet 61 through which the cable 62 is admitted connecting an external source of current supply to the within contained electric motor. Because of the aforedescribed mobility of the food mixer on its runner fins 55 and 56, locating the current supply cable 62 so that it will not interfere with this mobility presents a problem of conflict with the tilt-back feature. The cable is required to be out of range of physical interference with the food mixer so that it can glide upon the end bearing support of its spindles 47 and 48 as the skids 57 glide over the edge of the bowl lip formation 54.

Ideal operating conditions require that the space within the bowl 52 permits the interdigitating beater paddles and their shafts 47 and 48 to move about horizontally with the weight of the casing and its contained electric motor and transmission system distributed between said shafts and the runner edges 57 of the fins 55 and 56.

By making each one of the fins 55, 56 and 58 of identical contour, the versatility of this type of mixer may be extended to include a stable tilt-back support as best indicated in Fig. 7. Here the center of gravity may be considered as substantially coincident with the center of mass, which is maintained between the three leg points 64, 65 and 66. These points are in fact, aesthetic continuations of the fin structures 55, 56 and 58, respectively. In this form the length of the rearward extension is somewhat greater than extensions 35 in the preferred embodiment in order to provide adequate clearance for the cord or cable 62 after the manner designated in Fig. 7.

The weight of the handle 46 on one side of the casing tends to balance the combined weight of the two beater spindles 47 and 48. The gently resilient effect which is contributed by the turned under portion of cable 62 lying beneath the spindles 47 and 48 tends to resolve stability against any overbalancing effects which may be produced by the weight of clinging batter.

Because of placement of the two adjacent fins, 55 and 56, in the manner designated in Fig. 6, with the leg portions 64 and 65 extending rearwardly as they do, the apparatus may also be tipped forward and supported after the manner indicated in Fig. 8. In this way weight of the appliance is even more stably balanced over a wider spread of support points. Drippings from the beater paddles may be advantageously caught in a shallow vessel or dish such as the one designated 68 from which such drippings can be restored to the original batter.

While the present invention has been explained and described with reference to specifically contemplated embodiments of structure it is to be understood, nevertheless, that numerous modifications and variations are susceptible of being incorporated without departure from the essential spirit or scope thereof. Accordingly, it is not intended for an understanding of this invention to be limited to the illustrations in the annexed drawings or to the language employed in the foregoing specification except as indicated in the hereunto appended claims.

What is claimed is:

1. A portable food mixer comprising a tubular casing enclosure for containing an electric power motor and a twin spindle transmission driven thereby, including front and rear end portions, a handle carried by and forming a loop along a longitudinal element of said casing, a pair of beater spindles extending perpendicular to the axis of said casing near said front end portion and diametrically opposite said handle, and means for stably erecting said casing on its said rear portion with its said beater spindles poised comprising a pair of protuberances extending rearwardly of said casing spaced horizontally at diametrically opposite points of the center line of the casing and together constituting a fulcrum, and a projection at the rear end of said handle of such extent that upon tilting said casing backward and resting it upon said protuberances and said projection, the center of gravity of said casing is sufficiently shifted toward its said handle to overbalance said poised spindles.

2. In a portable food mixer, a substantially tubular casing for containing an electric motor and power take-off transmission, said casing having front and rear end walls, a pair of beater spindles driven by said transmission and projecting near the forward end of said casing in a direction substantially perpendicular to the axis of said casing, said casing being operable with its said axis in a generally horizontal direction and with said beater spindles extending downwardly into a mixing vessel, an operating current supply cable for said motor entering said casing through an aperture in said rear end wall thereof, and means for supporting said mixer at its rear end in up-ended erect position with its said beater spindles poised in a generally horizontal direction horizontally from the rear end position which comprises a pair of diametrically opposite radial fin formations blending into the contour of said casing near its rear most extremity, and each angularly equidistant from a plane passing centrally between said spindles and having a portion which juts in an axial direction sufficiently beyond said rear wall to provide marginal clearance to said cable when the latter is flexed sidewardly outside its rear wall aperture, and a projection disposed radially in diametric opposition to said beater spindles and extending rearwardly to constitute with said fin formations a three point footing support with the center of gravity of said mixer interposed vertically between them.

3. In a portable food mixer, a curved casing containing an electric motor in the rear portion and a transmission in the front portion driven by the electric motor including a pair of beater drive spindles opening downwardly below said transmission to receive the shafts of beaters therein having interdigitating blades rotatable upon axes located substantially perpendicular to the axis of said motor, means detachably interconnecting said spindles and shafts in drive engagement, said food mixer being operable to mix food with said axis of the motor disposed in a generally horizontal direction and with the beater shaft extending downwardly in a mixing vessel, and means for supporting said mixer on the rear end of the casing in upended position with the axis of said motor disposed vertically and with said beaters disposed in a generally horizontal position with the interdigitating blades of the beaters spaced horizontally from said rear end of the casing and with some of the blades disposed below the shafts to drain food mixtures thereon back into said vessel, the last said means comprising a pair of appendages spaced from each other at the rear end of the casing above the curve of the casing and blending into the contour thereof, said appendages being located equidistant from a plane passing between said spindles and through said motor axis, said appendages having portions which extend in an axial direction laterally and axially beyond the curve of said casing at its rear end, and means on said handle disposed radially opposite to said beater spindles and extending rearwardly to constitute with said appendages a footing for the casing and beaters at a plurality of spaced points in excess of two with the center of gravity of said food mixer disposed within a vertical projection of said footing to locate the beaters and support the casing in said position while the beaters are being drained and removed.

4. The combination called for in claim 3 including a resiliently mounted element engaging the beaters below said housing for ejecting the beaters automatically when the element is moved manually, said element and the housing having facing sides which converge upwardly within said projection of said footing when the mixer is resting on said footing to receive the finger of a person in downwardly pressed relation urging a spreading of said facing sides.

5. The combination called for in claim 3 including an operating current supply cable for said motor entering the rear portion of the casing through an aperture in said casing and said appendages providing clearance to said cable when the latter is flexed sidewardly outside of said aperture with the casing in said upended position.

References Cited in the file of this patent

UNITED STATES PATENTS

| Number | Name | Date |
|---|---|---|
| 749,363 | Cox | Jan. 12, 1904 |
| 1,231,056 | Palmer et al. | June 26, 1917 |
| 1,827,372 | Riddel | Oct. 13, 1931 |
| 1,862,826 | Mross | June 14, 1932 |
| 1,870,200 | Curtiss | Aug. 2, 1932 |
| 1,911,202 | Nielsen | May 30, 1933 |
| 2,048,455 | Knapp | July 21, 1936 |
| 2,430,817 | Jackson | Nov. 11, 1947 |
| 2,509,557 | Braatz | May 30, 1950 |

OTHER REFERENCES

McFarland abstract of application Serial No. 201,897, published January 22, 1952, 654 O. G. 1155.